Patented Feb. 12, 1929.

1,701,570

UNITED STATES PATENT OFFICE.

REGINALD FRANK KNIGHT AND FREDERICK LYNCH, OF BURNHAM, ENGLAND.

PROCESS FOR TOUGHENING AND HARDENING TAPS FOR CUTTING SCREW THREADS, MILLING CUTTERS, AND OTHER CUTTING TOOLS.

No Drawing. Application filed August 25, 1927, Serial No. 215,528, and in Great Britain September 1, 1926.

This invention relates to a process for toughening and hardening taps for cutting threads in metal, milling cutters and other cutting tools, and has for its object to produce a tap or tool whose core is tougher than its outer cutting portion, thus giving increased strength and minimizing the tendency to fracture due to stresses imposed when the tap or tool is in use, and to effect the said toughening without affecting substantially the hard condition of the outer cutting portion.

According to the invention, the toughening of the core of the tap or tool is effected by heating said core after the tap or tool has been bodily hardened, thus softening the said core whilst leaving the outer cutting portion of the tap or tool in hard condition.

In carrying out the said invention, a tap for cutting a screw thread, a milling cutter or other cutting tool is made in the usual manner up to the final operation before hardening.

Before said tap or tool is hardened a hole proportionate in diameter to the size of the tap or tool is drilled along the longitudinal centre line of the tap or tool so as to open out at each end of said tap or tool. As an example of the size of hole formed in a screw tap it is convenient in the case of a tap intended for threading a half-inch diameter hole, to make a one-eighth inch diameter hole through said tap.

The hole thus formed in the tap or tool is then filled with clay or other suitable filling and the tap or tool is bodily hardened in the well-known manner, the said filling ensuring even heat throughout the tap or tool during the hardening process and minimizing the risk of same distorting when immersed in liquid during such process.

After such hardening operation the filling is removed, a heating element is introduced into the hole in the tap or tool and the core of the tap or tool is thus heated to a degree necessary to restore the centre of said tap or tool, only, to its original soft condition. Preferably the heating element used for the purpose is an electric element which may consist of one or more heating wires through which electric current is passed, said wire or wires residing in and projecting from each end of the tap or tool. The electrical connections with the wire or wires to permit the engagement and disengagement of the tap or tool with said wire or wires may be of any suitable form and do not concern the present invention.

By the above-described process the core of the tap or tool is toughened whilst leaving the cutting edge of the tool hard.

Various modifications may be made in the process above-described without departing from the scope of the invention. For instance, the clay or similar filling material for insertion in the hole prior to hardening, need not necessarily be used; and, further, instead of forming a hole completely through the tap or tool for accommodating the heating element, a cavity with only one open end may be formed in said tap for accommodating said heating element.

We claim:—

A process for toughening and hardening taps for cutting screw threads, consisting in hollowing out said tap, whilst in its soft state, introducing a filling material into said hollow and then hardening the tap bodily, and finally softening the core of the tap by heating the interior thereof to toughen the same.

In testimony whereof we have affixed our signatures hereto this 13th day of August, 1927.

REGINALD FRANK KNIGHT.
FREDERICK LYNCH.